(12) United States Patent
Oh et al.

(10) Patent No.: US 9,139,150 B2
(45) Date of Patent: Sep. 22, 2015

(54) ASSEMBLY OF AIRBAG MODULE AND STEERING WHEEL

(71) Applicant: AUTOLIV DEVELOPMENT AB, Vårgårda (SE)

(72) Inventors: Jea Hyung Oh, Yongin-si (KR); Yeon Jin Ham, Osan-si (KR); Hoon Choi, Suwon-si (KR); Shinsuke Sato, Yokohama (JP); Akira Ueki, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/394,196

(22) PCT Filed: Mar. 27, 2013

(86) PCT No.: PCT/KR2013/002516
§ 371 (c)(1),
(2) Date: Oct. 13, 2014

(87) PCT Pub. No.: WO2013/154282
PCT Pub. Date: Oct. 17, 2013

(65) Prior Publication Data
US 2015/0069739 A1 Mar. 12, 2015

(30) Foreign Application Priority Data

Apr. 13, 2012 (KR) .......................... 10-2012-0038366

(51) Int. Cl.
*B60R 21/203* (2006.01)
(52) U.S. Cl.
CPC ........... *B60R 21/2037* (2013.01); *B60R 21/203* (2013.01)

(58) Field of Classification Search
CPC ............ B60R 21/2035; B60R 21/2037; B60R 21/203
USPC ................................................ 280/728.2, 731
See application file for complete search history.

(56) References Cited

U.S. PATENT DOCUMENTS 5,380,037 A * 1/1995 Worrell et al. ............. 280/728.2
5,636,859 A 6/1997 Williams et al.
(Continued)

FOREIGN PATENT DOCUMENTS

KR 20090050682 A 5/2009

OTHER PUBLICATIONS

International Search Report for PCT/KR2013/002516, ISA/KR, Daejeon, mailed Jul. 10, 2013.

*Primary Examiner* — Ruth Ilan
(74) *Attorney, Agent, or Firm* — Harness, Dickey & Pierce, P.L.C.

(57) ABSTRACT

An assembly of an airbag module includes an airbag housing receiving an airbag cushion and a steering wheel having a mounting plate part. The airbag housing has first hooks, the mounting plate part has second hooks coupled with the first hooks, respectively, and at least one of the first and second hooks has a protective member, at least a portion of which is interposed between the first and second hooks to prevent abrasion and contact noise between the first and second hooks due to the elastic movement of the airbag housing to the mounting plate part. The assembly minimizes the striking noise and the abrasion caused by friction between the airbag housing and the mounting plate part through the preventive member due to the elastic movement of the airbag housing to the mounting plate part.

19 Claims, 7 Drawing Sheets

(56) References Cited

U.S. PATENT DOCUMENTS

| | | | |
|---|---|---|---|
| 6,092,832 A * | 7/2000 | Worrell et al. | 280/728.2 |
| 7,540,530 B2 | 6/2009 | Helmstetter | |
| 7,789,415 B2 | 9/2010 | Groleau et al. | |
| 2009/0315304 A1 * | 12/2009 | Hagelgans et al. | 280/728.2 |
| 2011/0248481 A1 | 10/2011 | Amamori et al. | |

* cited by examiner

Fig. 1 - PRIOR ART
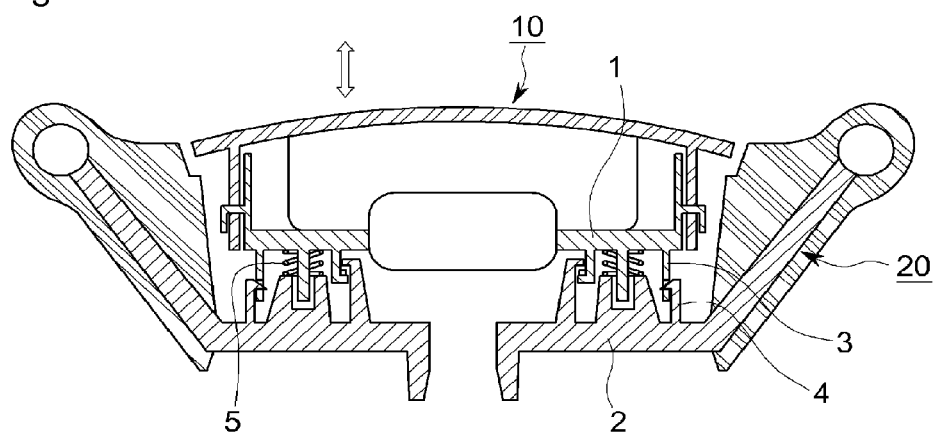
Fig. 2
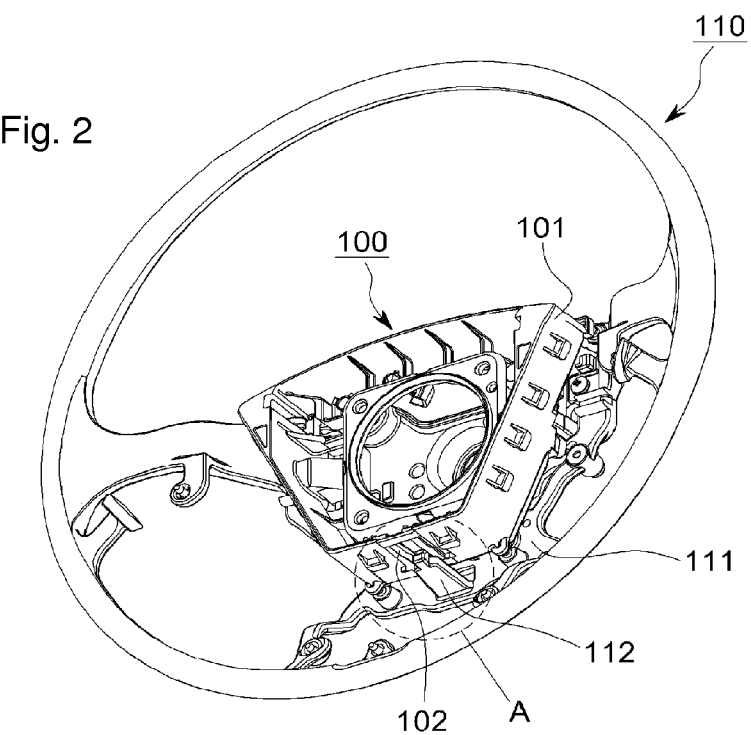

ASSEMBLY OF AIRBAG MODULE AND STEERING WHEEL

CROSS-REFERENCE TO RELATED APPLICATIONS

This application is a 371 U.S. National Stage of International Application No. PCT/KR2013/002516, filed Mar. 27, 2013, which claims priority to Korean Patent Application No. 10-2012-0038366, filed Apr. 13, 2012. The entire disclosures of both of the above applications are incorporated herein by reference.

TECHNICAL FIELD

The present invention relates to an assembly of an airbag module and a steering wheel. In more particular, the present invention relates to an assembly of an airbag module and a steering wheel, capable of minimizing the striking noise and the abrasion caused by friction in the connection part between a mounting plate part and an airbag housing when the airbag housing elastically moves up and down with respect to the mounting plate part of the steering wheel.

BACKGROUND ART

In general, as shown in FIG. 1, an assembly of an airbag module and a steering wheel (hereinafter, assembly) is constructed by coupling an airbag module 10 including an airbag housing 1 receiving an airbag cushion with a steering wheel 20 provided at the central portion thereof with a mounting plate part 2 in such a manner that the airbag housing 1 elastically moves with respect to the mounting plate part 2.

In detail, an elastic member 5 such as a spring is interposed between the airbag housing 1 and the mounting plate part 2, so that the airbag housing 1 can elastically move up and down with respect to the mounting plate part 2 due to the elasticity of the elastic member 5.

In addition, the airbag housing 1 has a plurality of first hooks 3, and the mounting plate part 2 has a plurality of second hooks 4 coupled with the first hooks 1, respectively.

In the above structure, when vertical vibration occurs due to the driving of a vehicle or when a horn function is performed to give alarm sound to an object at the front of the vehicle, the airbag housing 1 momentarily approaches the mounting plate part 2 and returns to the initial position thereof due to the elasticity of the elastic member 5. In addition, as described above, the first hook 3 relatively moves up and down with respect to the second hook 4 in a fixed state to strike the second hook 4.

However, according to the related art, since an additional member is not provided in the contact part between the first and second hooks 3 and 4, when the airbag housing 1 relatively moves, the first hook 3 strikes the second hook 4 to cause striking noise, and the abrasion of the first and second hooks 3 and 4 may occur due to the direct contact of the first and second hooks 3 and 4.

The striking nose and the abrasion not only make a driver complained, but make the airbag housing 1 in an unstable installation state. Accordingly, the development of a technology of reducing the striking noise and the abrasion is required.

DISCLOSURE OF INVENTION

Technical Problem

Accordingly, the present invention has been made keeping in mind the above problems occurring in the prior art, and an object of the present invention is to provide an assembly of an airbag module and a steering wheel, capable of minimizing the striking noise and the abrasion caused by friction in the connection part between a mounting plate part and an airbag housing when the airbag housing elastically moves up and down with respect to the mounting plate part of the steering wheel.

Another object of the present invention is to provide an assembly of an airbag module and a steering wheel, capable of improving durability by stably maintaining the coupling state of the airbag housing and the mounting plate part by minimizing the abrasion of the connection part between the mounting plate part and the airbag housing.

Objects of the present invention may not be limited to the above, and other objects of the present invention will be apparently comprehended by those skilled in the art when making reference to embodiments in the following description.

Solution to Problem

In order accomplish the above objects, there is provided an assembly of an airbag module and a steering wheel, which is constructed by coupling the airbag module including an airbag housing receiving an airbag cushion with the steering wheel provided at a central portion thereof with a mounting plate part so that the airbag housing is elastically movable with respect to the mounting plate part. The airbag housing has a plurality of first hooks, the mounting plate part has a plurality of second hooks coupled with the first hooks, respectively, and at least one of the first and second hooks has a protective member, at least a portion of which is interposed between the first and second hooks to prevent abrasion and contact noise between the first and second hooks due to the elastic movement of the airbag housing.

In this case, the first hook may include a pair of first vertical blocks, which are spaced apart from each other while extending by a predetermined distance along a movement direction of the airbag housing with respect to the mounting plate part, and a first horizontal block connecting the first vertical blocks to each other. The protective member may have a portion inserted into the first horizontal block and make contact with the first and second hooks when the airbag housing elastically moves.

The protective member may include a plastic material, and may be fixed to the first hook through a thermal welding scheme.

The first horizontal block may protrude in a front direction from first surfaces of the first vertical blocks. The protective member may include a base bar making contact with one surface of the first horizontal block, and at least one protrusion protruding from one surface of the base bar and inserted into at least one insertion hole formed in the first horizontal block.

The insertion hole may be perforated along a height direction of the first horizontal block, an end portion of the protrusion may be exposed to an outside through the insertion hole, and the protective member may be fixed to the first hook by thermally welding the exposed end portion of the protrusion.

The first hook may include a pair of first vertical blocks, which are spaced apart from each other while extending by a predetermined distance along a movement direction of the airbag housing with respect to the mounting plate part, and a first horizontal block connecting the first vertical blocks to each other, and the protective member may be hooked with the first vertical blocks and the first horizontal block, and make contact with the first and second hooks when the airbag housing elastically moves.

The protective member may include an upper body having a plurality of first locking parts locked with the first vertical blocks, respectively, when coupling with the first hook, a lower body having a plurality of second locking parts locked with the first horizontal block when coupling with the first hook, and a connection body connecting the upper body with the lower body.

In a state that the protective member is coupled with the first hook, the first locking parts may extend to both sides of the upper body so that the first locking parts are locked with rear direction surfaces of the first vertical blocks in a contact state with the rear direction surfaces of the first vertical blocks. In the state that the protective member is coupled with the first hook, the second locking parts may protrude upward from the lower body toward the first locking parts so that the second locking parts are locked with a rear direction surface of the first horizontal block in a contact state with the rear direction surface of the first horizontal block.

A front direction surface of the first horizontal block may be rounded, and an inner surface of the connection body, which faces the front direction surface of the first horizontal block, and an outer surface opposite to the inner surface may be rounded corresponding to the front direction surface of the first horizontal block.

The first hook may include a pair of first vertical blocks, which are spaced apart from each other while extending by a predetermined distance along a movement direction of the airbag housing with respect to the mounting plate part, and a first horizontal block connecting the first vertical blocks to each other, and the protective member may be hooked with the first horizontal block, and make contact with the first and second hooks when the airbag housing elastically moves.

The first horizontal block may be provided at a lower central portion thereof with a cutting region, and a locking protrusion may protrude at a lower portion of the first horizontal block in the cutting region. The protective member may include an upper body seated on a central top surface of the first horizontal block when coupling with the first hook, and a lower body connected to the upper body and having a locking step so that the locking protrusion is hooked with the locking step when coupling with the first hook. The lower body may be provided in the cutting region.

A front direction surface of the locking protrusion may be inclined.

A front direction surface of the first horizontal block may be rounded, and a front direction surface of the lower body may be rounded so that the front direction surface of the lower body has a curvature equal to a curvature of the front direction surface of the first horizontal block.

In a state that the protective member is coupled with the first hook, a front direction surface of the upper body and the front direction surface of the lower body may be placed on a same plane with the front direction surface of the first horizontal block, or may be spaced apart from the front direction surface of the first horizontal block toward a rear portion of the first horizontal block.

The protective member may include a plastic material softer than materials constituting the airbag housing, the first hook, and the second hook.

The protective member may include one selected from the group consisting of, TPU (thermo plastic polyurethane) and TPO (thermo plastic olefin).

Advantageous Effects of Invention

The assembly of the airbag module and the steering wheel according to the embodiment of the present invention has following effects.

First, when the airbag housing elastically moves up and down with respect to the mounting plate part of the steering wheel, the striking noise and the abrasion caused by friction can be minimized in the connection part of the mounting plate part and the airbag housing by using an abrasion and noise prevention member.

Second, the coupling state of the airbag housing with respect to the mounting plate part can be stably maintained by preventing the first and second hooks from being abraded, thereby improving durability.

Effects of the present invention may not be limited to the above, and other objects of the present invention will be apparently comprehended by those skilled in the art when making reference to embodiments in the following description.

BRIEF DESCRIPTION OF DRAWINGS

FIG. 1 is a sectional view showing an assembly of an airbag module and a steering wheel according to the related art;

FIG. 2 is a perspective view showing an assembly of an airbag module and a steering wheel according to a first embodiment of the present invention;

MODE FOR THE INVENTION

Figure 3:
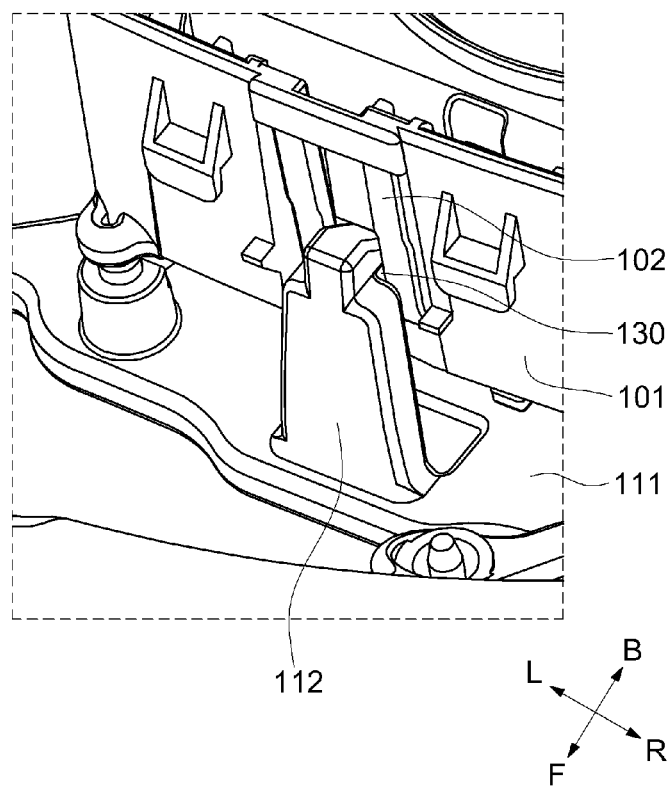
FIG. 3 is an enlarged view showing a part A of FIG. 2.

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention. The same reference numerals will be used to refer to the same elements.

An assembly of an airbag module and a steering wheel according to embodiments of the present invention (hereinafter, assembly) is to prevent the abrasion or the frictional noise between first and second hooks caused when driving vibration of a vehicle occurs or when a driver carries out a horn function in the state that the first hook provided in the airbag housing is coupled with the second hook provided in the steering wheel. In detail, according to the present embodiments, the durability of the first and second hooks can be prevented from being degraded due to the above abrasion and frictional noise and the driver can be prevented from being complained due to the above abrasion and frictional noise.

Hereinafter, the assembly according to the present invention will be described with reference to various embodiments. Prior to the detailed description, reference signs F, B, L, and R in accompanying drawings represent a front direction, a back (rear) direction, a left direction, and a right direction, respectively.

Figure 4:
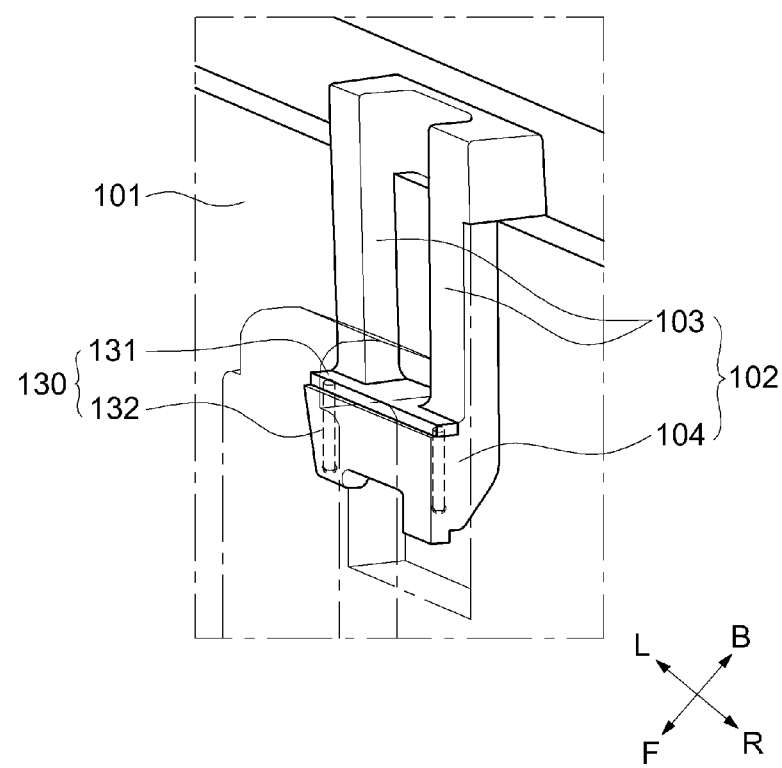
FIG. 4 is a perspective view showing the installation of an abrasion and noise prevention member in the assembly of the airbag module and the steering wheel according to the first embodiment of the present invention.
Figure 5:
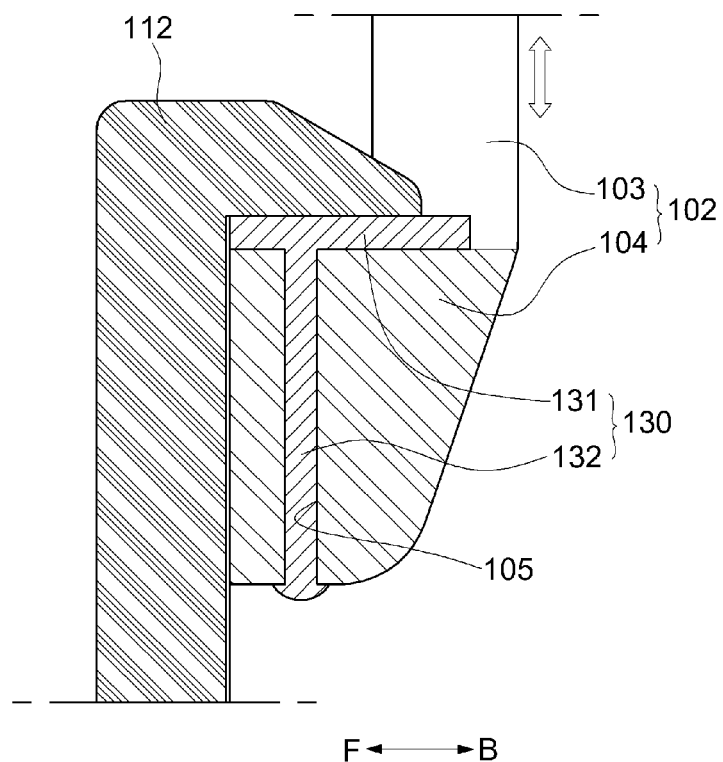
FIG. 5 is a sectional view showing the installation of the abrasion and noise prevention member in the assembly of the airbag module and the steering wheel according to the first embodiment of the present invention.
Figure 6:
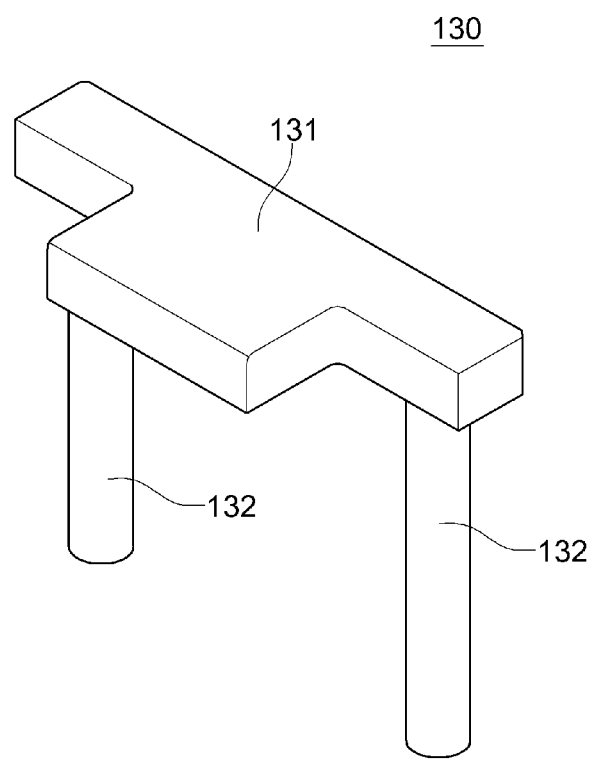
FIG. 6 is a perspective view showing the abrasion and noise prevention member of the assembly of the airbag module and the steering wheel according to the first embodiment of the present invention.

FIG. 2 is a perspective view showing an assembly of an airbag module and a steering wheel according to a first embodiment of the present invention, FIG. 3 is an enlarged view showing a part A of FIG. 2, and FIG. 4 is a perspective view showing the installation of an abrasion and noise prevention member in the assembly of the airbag module and the steering wheel according to the first embodiment of the present invention. FIG. 5 is a sectional view showing the installation of the abrasion and noise prevention member in the assembly of the airbag module and the steering wheel according to the first embodiment of the present invention, and FIG. 6 is a perspective view showing the abrasion and noise prevention member of the assembly of the airbag module and the steering wheel according to the first embodiment of the present invention.

As shown in FIGS. 2 and 3, the assembly according to the first embodiment of the present invention is constructed by coupling an airbag module 100 including an airbag housing 101 receiving an airbag cushion with a steering wheel 110 provided at the central portion thereof with a mounting plate part 111. As described in the related art, the airbag housing 101 is coupled with the mounting plate part 111 in such a manner that the airbag housing 101 can elastically move up and down with respect to the mounting plate part 2 through an elastic member such as a spring.

Meanwhile, the airbag housing 101 has a plurality of first hooks 102, and the mounting plate part 111 has a plurality of second hooks 112 coupled with the first hooks 102, respectively. In this case, although the number of installed first and second hooks 102 and 112 is not limited, at least three hooks may be preferably provided for the purpose of the stable installation of the airbag housing 101.

According to the first embodiment of the present invention, as shown in FIGS. 4 and 5, an abrasion and noise prevention member 130 (although the term abrasion and noise prevention member is used in the detailed description of the present invention, the term the abrasion and noise prevention member is replaced with the term preventive member in claims) is provided at one of the first and second hooks 102 and 112. At least a portion of the abrasion and noise prevention member 130 is interposed between the first and second hooks 102 and 112 to prevent the abrasion and the contact noise of the first and second hooks 102 and 112 caused by the elastic movement of the airbag housing 101.

In detail, the first hook 102 includes a pair of first vertical blocks 103, which are spaced apart from each other while extending by a predetermined distance along a movement direction of the airbag housing 101 with respect to the mounting plate part 111, and a first horizontal block 104 connecting lower portions of the paired first vertical blocks 103 to each other. In this case, the first horizontal block 104 protrudes in a front direction from one surface (front direction surface) of the paired first vertical blocks 103, so that the first horizontal block 104 forms a step with respect to the first vertical blocks 103.

According to the present embodiment, the airbag housing 101 and the first hook 102 include a plastic material, and are integrally formed with each other through an injection molding process. In addition, for example, the mounting plate part 111 and the second hook 112 include a metallic material containing magnesium (Mg).

As shown in FIGS. 4 and 5, a portion of the abrasion and noise prevention member 130 can be inserted into the first horizontal block 104. In detail, when the airbag housing 101 elastically moves due to the driving vibration of the vehicle or the performing of the horn function by the driver, the abrasion and noise prevention member 130 makes contact with both of the first and second hooks 102 and 112 to minimize the abrasion and the frictional noise between the first and second hooks 102 and 112. In addition, the abrasion and noise prevention member 130 may be provided in the second hook 112 instead of the first horizontal block 104. For example, the abrasion and noise prevention member 130 may be fixedly installed in the second hook 112 through a screw mounting work. Hereinafter, the case in which the abrasion and noise prevention member 130 is provided in the first horizontal block 104 of the first hook 102 will be described.

According to the present embodiment, the abrasion and noise prevention member 130 includes a plastic material. For example, the abrasion and noise prevention member 130 may include a plastic material softer than a material constituting the airbag housing 101, the first hook 102, and the second hook 112. In addition, according to one embodiment, the first hook 102 may be manufactured by using PA-based resin containing glass fiber, the second hook 112 may include a metallic material, and the abrasion and noise prevention member 130 may include one selected from the group consisting of polyoxymethylene POM, TPU (Thermo Plastic Polyurethane) and TPO (Thermo Plastic Olefin) softer than the materials constituting the first and second hooks 102 and 112. In general, since the above three material-based resins not only have predetermined softness, but sufficient strength against the abrasion, the striking noise and the abrasion caused by the friction, which occur when the first and second hooks make the friction according to the related art, can be reduced.

According to the present embodiment, as shown in FIGS. 5 and 6, the abrasion and noise prevention member 130 includes a base bar 131 making contact with one surface of the first horizontal block 104 and at least one protrusion 132 protruding from one surface of the base bar 131 and inserted into at least one insertion hole 105 formed in the first horizontal block 104. In this case, a portion of a top surface of the base bar 131 serves as a contact surface contactable with the second hook 112. In addition, although two insertion holes 105 and two protrusions 132 are provided according to the present embodiment, the present invention is not limited thereto.

The abrasion and noise prevention member 130 may be fixed to the first hook 102 through a thermal welding scheme. In detail, as shown in FIG. 5, the insertion hole 105 is perforated along the height direction of the first horizontal block 104, and an end portion of the protrusion 132 is exposed to the outside through the insertion hole 105. In other words, in the state that the protrusion 132 of the abrasion and noise prevention member 130 is completely inserted, a lower end of the protrusion 132 protrudes beyond the bottom surface of the first horizontal block 104. In this case, a work melts the exposed end portion of the protrusion 132 through a thermal welding scheme by using an additional welding machine. In this case, the sectional area of the end portion of the protrusion 132 is more irregularly expanded than an initial sectional area thereof, so that the protrusion 132 can be prevented from being out of the insertion hole 105. Accordingly, the abrasion and noise prevention member 130 may be fixed to the first hook 102.

Hereinafter, the operational relation of the assembly according to the first embodiment of the present invention will be described in brief.

First, if the vertical vibration does not occur in vehicle driving, and a driver does not carry out the horn function, the abrasion and noise prevention member 130 is always maintained in the contact with the second hook 112 by the elasticity of the elastic member such as a spring.

In this case, if the above vertical vibration occurs or the above horn function is performed, the abrasion and noise prevention member 130 momentarily moves down so that the abrasion and noise prevention member 130 is released from the contact state with the second hook 112. Thereafter, the abrasion and noise prevention member 130 makes contact with the second hook 112 again.

In other words, according to the present embodiment, the abrasion and noise prevention member 130 is further provided to prevent the first and second hooks 102 and 112 from directly making contact with each other, thereby reducing the abrasion and the striking noise caused by the friction, which occur as the first and second hooks 102 and 112 directly make contact with each other.

Figure 7:
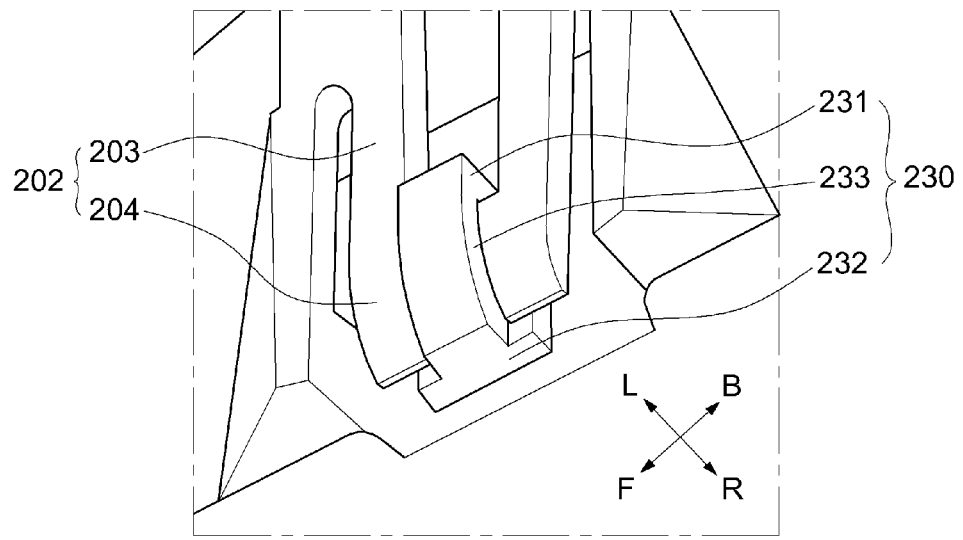
FIG. 7 is a perspective view showing the installation of an abrasion and noise prevention member in an assembly of an airbag module and a steering wheel according to a second embodiment of the present invention.
Figure 8:
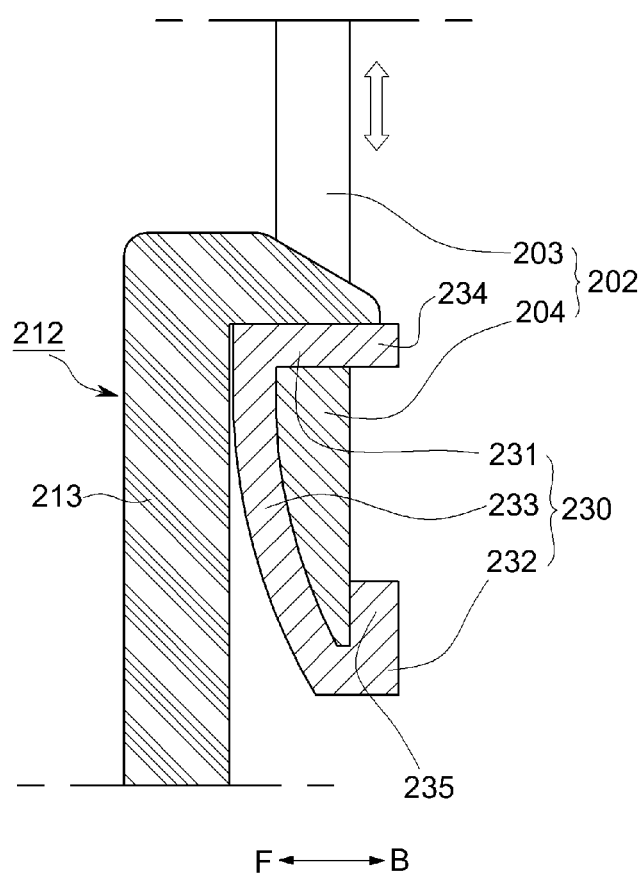
FIG. 8 is a sectional view showing the installation of the abrasion and noise prevention member in the assembly of the airbag module and the steering wheel according to the second embodiment of the present invention.
Figure 9:
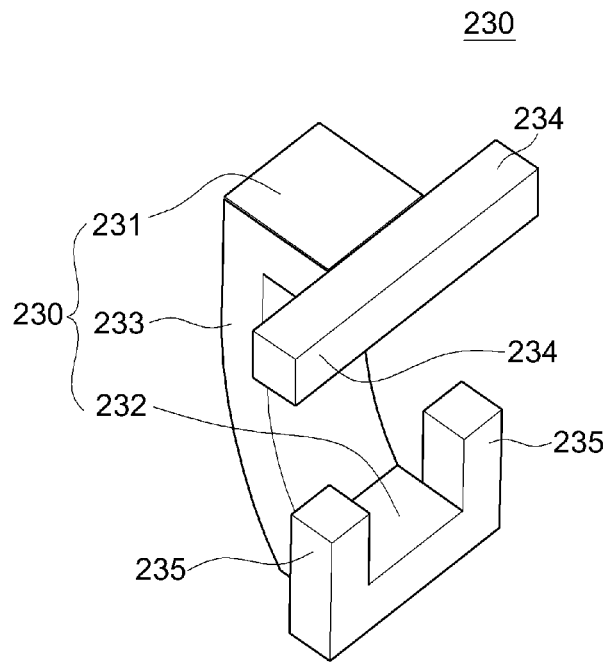
FIG. 9 is a perspective view showing the abrasion and noise prevention member in the assembly of the airbag module and the steering wheel according to the second embodiment of the present invention.

FIG. 7 is a perspective view showing the installation of an abrasion and noise prevention member in an assembly of an airbag module and a steering wheel according to a second embodiment of the present invention, FIG. 8 is a sectional view showing the installation of the abrasion and noise prevention member in the assembly of the airbag module and the steering wheel according to the second embodiment of the present invention, and FIG. 9 is a perspective view showing the abrasion and noise prevention member in the assembly of the airbag module and the steering wheel according to the second embodiment of the present invention.

Hereinafter, an assembly according to the second embodiment of the present invention will be described.

Prior to the description of the assembly according to the second embodiment, the structure and components identical to those of the first embodiment will not be further described, and the same components in the related drawing will be assigned with reference numerals 200s.

According to the second embodiment of the present invention, as shown in FIGS. 7 and 8, similarly to the first embodiment, a first hook 202 includes a pair of first vertical blocks 203, which are spaced apart from each other while extending by a predetermined distance along a movement direction of an airbag housing with respect to a mounting plate part, and a first horizontal block 204 connecting lower portions of the first vertical blocks 203 to each other. In this case, although the first horizontal block 204 does not protrude from a front direction surface of the first vertical block 203 differently from the first embodiment, the first horizontal block 204 may have the shape similar to the shape of the first horizontal block of the first embodiment.

According to the present embodiment, an abrasion and noise prevention member 230 is configured to be hooked with the first vertical blocks 203 and the first horizontal block 204. At least a portion of the abrasion and noise prevention member 230 is interposed between the first hooks 202 and the second hook 212 to prevent the abrasion and the contact noise between the first and second hooks 202 and 212 caused by the elastic movement of the airbag housing.

As shown in FIGS. 7 to 9, the abrasion and noise prevention member 230 includes an upper body 231 having a plurality of first locking parts 234 locked with the paired first vertical blocks 203, respectively, when coupling with the first hook 202, a lower body 232 having a plurality of second locking parts 235 locked with the first horizontal block 203 when coupling with the first hook 202, and a connection body 233 connecting the upper body 231 with the lower body 232. In this case, the abrasion and noise prevention member 230 may include a material the same as a material of the first embodiment. In addition, the upper body 231, the lower body 232, and the connection body 233 are integrally formed with each other.

In detail, two first locking parts 234 are provided, and extend by a predetermined length from both sides of the upper body 231. In addition, two second locking parts 235 are provided, and extend by a predetermined length upward from the lower body 232 toward the first locking parts 234. In this case, a portion of the top surface of the upper body 231 serves as a contact surface contactable with the second hook 212.

In the above structure, when coupling the abrasion and noise prevention member 230 with the first hook 202, in the state that a worker hooks the second locking parts 235 with lower end portions of the firs horizontal block 204, the worker forcibly inserts the first locking parts 234 into the space between one pair of the first vertical blocks 203. In this case, since the abrasion and noise prevention member 230 includes a material having predetermined softness, the above forcible insertion can be performed. In this case, although the first locking parts 234 are momentarily deformed, the shape of the first locking parts 234 can be recovered to the initial shape thereof due to the softness thereof after the coupling has been completed.

In detail, in the state that the abrasion and noise prevention member 230 is coupled with the first hook 202 through the above procedure, the two first locking parts 234 are locked with the rear direction surfaces of one pair of the first vertical blocks 203 in the contact with the rear direction surfaces of the first vertical blocks 203. In addition, in the state that the abrasion and noise prevention member 230 is coupled with the first hook 202, the two second locking parts 235 are locked with the rear direction surface of the first horizontal block 204 in the contact with the rear direction surface of the first horizontal block 204.

In other words, according to the second embodiment of the present invention, the two first locking parts 234 and the two second locking parts 235 serve as hooks to fix the abrasion and noise prevention member 230 to the first hook 202.

Meanwhile, as shown in FIG. 8, the front direction surface of the first horizontal block 204 is rounded. In addition, in the state that the abrasion and noise prevention member 230 is coupled with the first hook 202, an inner surface (directed inward) of the connection body 233, which may face the front direction surface of the first horizontal block 204, and an outer surface (directed outward) opposite to the inner surface are rounded corresponding to the front direction surface of the first horizontal block 204. In this case, as shown in FIG. 8, a predetermined interval is formed between a vertical portion 213 of the second hook 212 and the connection body 233, thereby preventing the connection body 233 from interfering with the vertical portion 213 of the second hook 212 when the connection body 233 is lifted according to the elastic movement of the airbag housing. In detail, if the above interference occurs between the connection body 233 and the vertical portion 213 of the second hook 212, the elastic movement of the airbag housing may not be smoothly performed, and the abrasion and the contact noise more strongly occur due to the interference between the connection body 233 and the vertical portion 213 of the second hook 212.

In summary, the first embodiment of the present invention discloses that the abrasion and noise prevention member 130 is fixed to the first hook 102 through a thermal welding scheme, and the second embodiment discloses that the abrasion and noise prevention member 230 is fixed to the first hook 202 through the hook function of the first and second locking parts 234 and 235. In other words, differently from the first embodiment, the second embodiment of the present invention has an advantage in that the abrasion and noise prevention member 230 is more rapidly and easily coupled with the second hook 212 through the simple hook structure without the thermal welding process.

Figure 10:
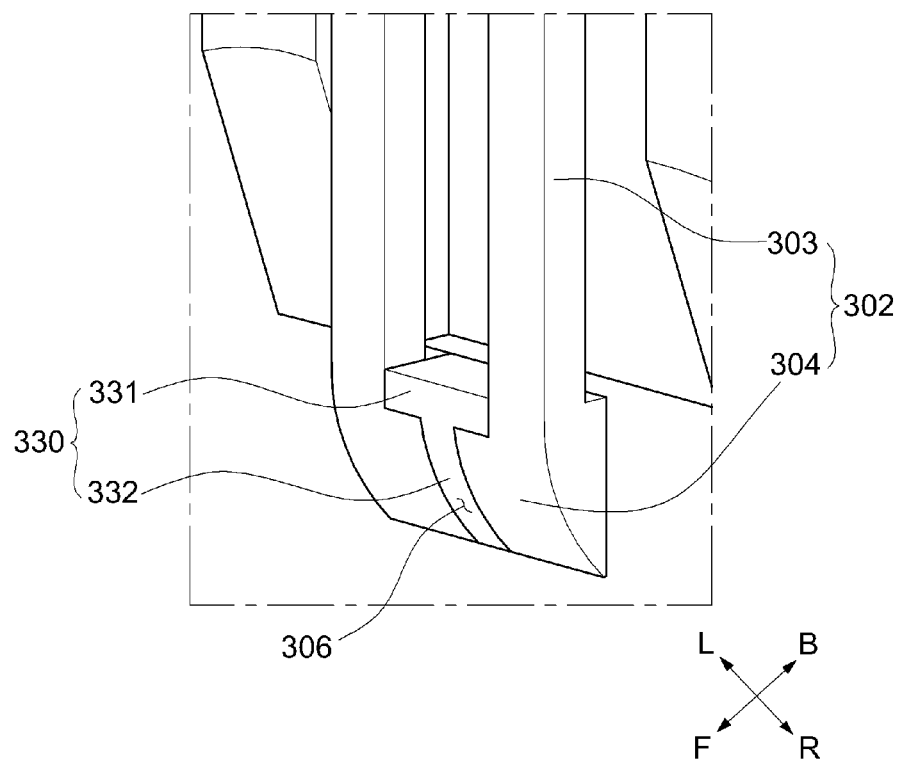
FIG. 10 is a perspective view showing the installation of an abrasion and noise prevention member in an assembly of an airbag module and a steering wheel according to a third embodiment of the present invention.
Figure 11:
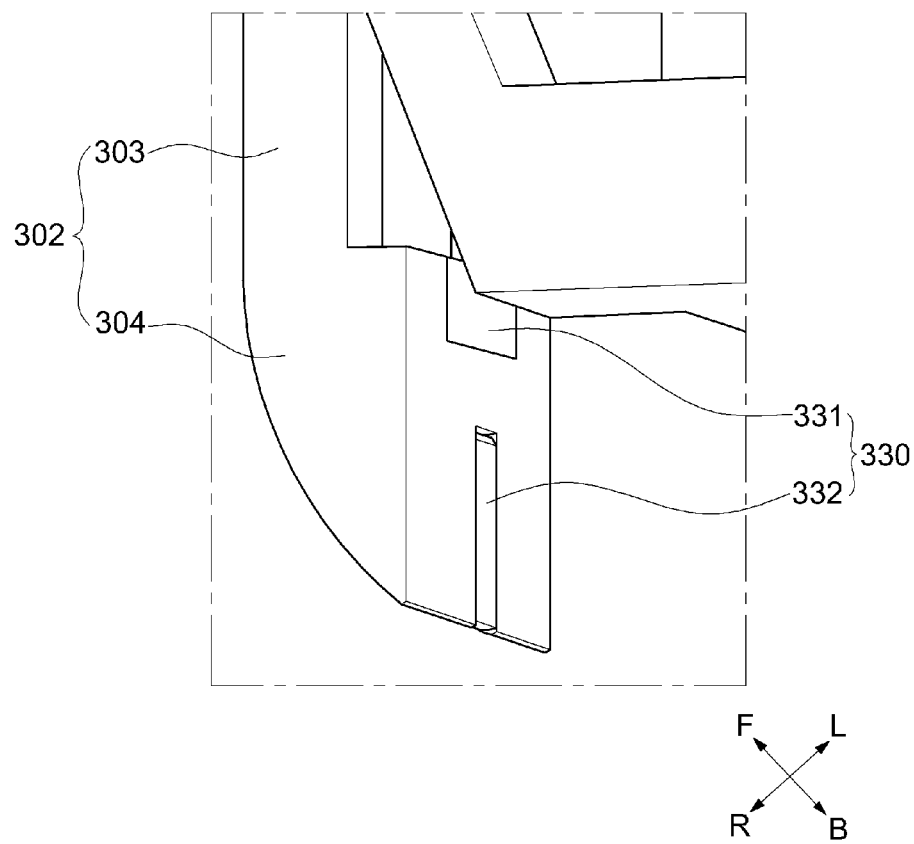
FIG. 11 is a rear perspective view of FIG. 10.
Figure 12:
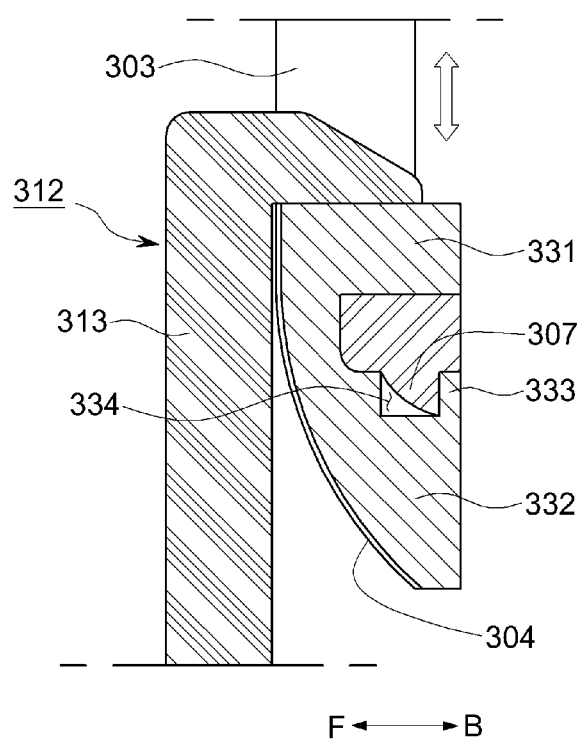
FIG. 12 is a sectional view showing the installation of the abrasion and noise prevention member in the assembly of the airbag module and the steering wheel according to the third embodiment of the present invention.
Figure 13:
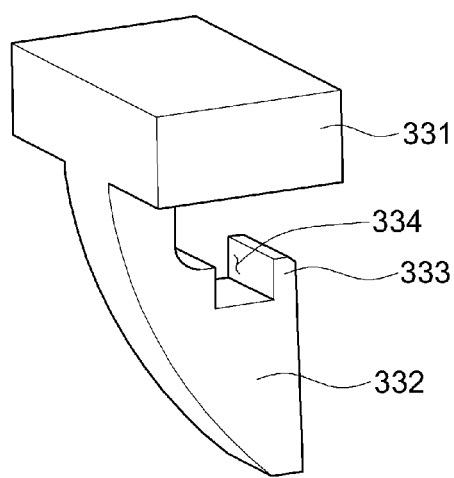
FIG. 13 is a perspective view showing the abrasion and noise prevention member in the assembly of the airbag module and the steering wheel according to the third embodiment of the present invention.

FIG. 10 is a perspective view showing the installation of an abrasion and noise prevention member in an assembly of an airbag module and a steering wheel according to a third embodiment of the present invention, FIG. 11 is a rear perspective view of FIG. 10, FIG. 12 is a sectional view showing the installation of the abrasion and noise prevention member in the assembly of the airbag module and the steering wheel according to the third embodiment of the present invention, and FIG. 13 is a perspective view showing the abrasion and noise prevention member in the assembly of the airbag module and the steering wheel according to the third embodiment of the present invention.

Hereinafter, the assembly according to the third embodiment of the present invention will be described.

Prior to the detailed description of the assembly according to the second embodiment, the structure and components identical to those of the first embodiment will not be further described, and the same components in the related drawing will be assigned with reference numerals 300s.

According to the third embodiment of the present invention, as shown in FIGS. 10 to 12, similarly to the first embodiment, a first hook 302 includes a pair of first vertical blocks 303, which are spaced apart from each other while extending by a predetermined length along the movement direction of the airbag housing with respect to a mounting plate part, and a first horizontal block 304 coupling the first vertical blocks 303 with each other. In this case, differently from the first embodiment, the first horizontal block 304 does not protrude from the front direction surface of the first vertical block 303. However, the present invention is not limited thereto, and the first horizontal block 304 may have the shape similar to the shape of the first horizontal block of the first embodiment.

According to the present embodiment, an abrasion and noise prevention member 330 is hooked with the first horizontal block 304. At least a portion of the abrasion and noise prevention member 330 is interposed between the first and second hooks 302 and 312 to prevent the abrasion and the contact noise of the first and second hooks 302 and 312 caused by the elastic movement of the airbag housing.

Meanwhile, as shown in FIG. 10, a cutting region 306 is provided at a lower central portion of the first horizontal block 304, and a locking protrusion 307 protrudes at the lower portion of the first horizontal block 304 in the cutting region 306.

As shown in FIGS. 12 and 13, the abrasion and noise prevention member 330 includes an upper body 331 seated on a central top surface of the first horizontal block 304 when coupling with the first hook 302, and a lower body 332 connected to the upper body 331 and having a locking step 333 so that the locking protrusion 307 may be hooked with the locking step 333 when coupling with the first hook 302. According to the present embodiment, a top surface of the upper body 331 serves as a contact surface contactable with the second hook 312.

In addition, according to the present embodiment, the abrasion and noise prevention member 330 may include a material the same as a material constituting an abrasion and noise prevention member of the first embodiment. In addition, the lower body 332 is provided in the cutting region 306 in the state that the abrasion and noise prevention member 330 is hooked with the first hook 302, and the upper body 331 and the lower body 332 are integrally formed with each other. In addition, the lower body 332 is formed therein with a groove 334 which can receive the locking protrusion 307 and employs the locking step 333 serving as one sidewall thereof.

In the above structure, when the abrasion and noise prevention member 330 is coupled with the first hook 302, after a worker places the abrasion and noise prevention member 330 at the front of the first hook 302, the worker pushes the abrasion and noise prevention member 330 to the first hook 302. In this case, a bottom surface of the upper body 331 partially makes contact with the top surface of the first horizontal block 304. Thereafter, the worker more pushes the abrasion and noise prevention member 330 so that the abrasion and noise prevention member 330 is coupled with the first hook 302.

In detail, as shown in FIG. 12, since the front direction surface of the locking protrusion 307 is inclined, when the worker pushes the abrasion and noise prevention member 330, the locking step 333 sequentially moves along the inclined surface of the locking protrusion 307 and then moves to the rear portion of the locking protrusion 307 by passing through the locking protrusion 307. In this case, the locking protrusion 307 is received in the groove 334 in the state that the locking protrusion 307 is hooked with the locking step 333. In addition, as shown in FIG. 12, when viewed in a side view, the front direction surface of the locking protrusion 307 is inclined downward so that the width between the left and right sides of the locking protrusion 307 is gradually reduced from the upper region thereof toward the lower region. If the front direction surface of the locking protrusion 307 is not inclined, the worker may not easily couple the abrasion and noise prevention member 330 to the first hook 332.

According to the present embodiment, in the state that the abrasion and noise prevention member 330 is coupled with the first hook 302, the bottom surface of the upper body 331 makes contact with the top surface of the first horizontal block 304, and the locking protrusion 307 is hooked with the locking step 333 in the contact with the locking step 333.

In other words, according to the third embodiment of the present invention, the locking protrusion 307 and the locking step 333 serves as a hook to fix the abrasion and noise prevention member 330 to the first hook 302.

Meanwhile, similarly, as shown in FIGS. 10 and 12, the front direction surface of the first horizontal block 304 is rounded. In addition, the front direction surface of the lower body 332 is rounded so that the front direction surface of the lower body 332 has the same curvature as that of the front direction surface of the first horizontal block 304. However, the present invention is not limited thereto, and the front direction surface of the lower body 332 may have a flat surface.

In this case, in the state that the abrasion and noise prevention member 330 is coupled with the first hook 302, the front direction surfaces of the upper and lower bodies 331 and 332 may be continuously connected to the front direction surface of the first horizontal block 304, or may be spaced apart from the front direction surface of the first horizontal block 304 toward the rear portion of the first horizontal block 304. More preferably, the front direction surfaces of the upper and lower bodies 331 and 332 are spaced apart from the front direction of the first horizontal block 304 toward the rear portion of the first horizontal block 304. Meanwhile, when the front direction surfaces of the upper and lower bodies 331 and 332 are continuously connected to the front direction surface of the first horizontal block 304, the front direction surfaces of the first horizontal block 304, the upper body 331, and the lower body 332 are placed on the same plane.

In this case, as shown in FIG. 12, the lower body 332 has a predetermined interval from the vertical portion 313 of the second hook 312 so that the lower body 332 can be prevented from interfering with the vertical portion 313 of the second hook 312 when the lower body 332 is lifted according to the elastic movement of the airbag housing. In addition, if the above interference occurs between the lower body 332 and the vertical portion 313 of the second hook 312, the elastic up and down movement of the airbag housing may not be smoothly performed, and the abrasion and the contact noise may more strongly occur due to the interference between the lower body 332 and the vertical portion 313 of the second hook 312.

In addition, as described above, when the front direction surfaces of the upper and lower bodies 331 and 332 are spaced apart from the front direction surface of the first horizontal block 304 toward the rear portion of the first horizontal block 304, since the contact between the front direction surface of the abrasion and noise prevention member 330 and the second hook 312 can be basically prevented, the abrasion and the contact noise caused by the contact can be basically prevented.

In summary, the first embodiment of the present invention discloses that the abrasion and noise prevention member 130 is fixed to the first hook through the thermal welding scheme, and the third embodiment discloses that the abrasion and noise prevention member 130 is fixed to the first hook 302 through the hook function of the locking protrusion 307 and the locking step 333. In other words, differently from the first embodiment, the third embodiment of the present invention has an advantage in that the abrasion and noise prevention member 330 can be more rapidly and easily coupled with the second hook 312 through the simple hook locking structure without the thermal welding process.

According to three embodiments of the present invention described above, when the airbag housing relatively moves up and down with respect to the mounting plate part, the first hook 102, 203, or 302 is prevented from directly making contact with the second hook 112, 212, or 312 by using the abrasion and noise prevention member 130, 230, or 330 including a softer material, thereby minimizing the striking noise and the abrasion.

In addition, according to the present invention, the abrasion between the first hook 102, 202, or 302 and the second hook 112, 212, or 312 is minimized by the abrasion and noise prevention member 130, 230, or 330, so that the coupling state between the airbag housing and the mounting plate part can be stably maintained to improve the durability.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. An assembly of an airbag module comprising:
an airbag housing receiving an airbag cushion; and
a steering wheel provided at a central portion of the airbag module and having a mounting plate part coupled to the airbag housing such that the airbag housing is elastically movable with respect to the mounting plate part,
wherein the airbag housing has a plurality of first hooks, the mounting plate part has a plurality of second hooks coupled with the plurality of first hooks, respectively, and at least one of the first and second hooks has a protective member, at least a portion of the protective member interposed between the first and second hooks to prevent abrasion and contact noise between the first and second hooks due to the elastic movement of the airbag housing;
wherein the first hook includes a pair of first vertical blocks spaced apart from each other while extending by a predetermined distance along a movement direction of the airbag housing with respect to the mounting plate part, and a first horizontal block connecting the pair of first vertical blocks to each other, and
wherein the protective member has a portion inserted into the first horizontal block and makes contact with the first and second hooks when the airbag housing elastically moves.

2. The assembly of claim 1, wherein the protective member includes a plastic material, and is fixed to the first hook through a thermal welding scheme.

3. The assembly of claim 2, wherein the first horizontal block protrudes in a front direction from first surfaces of the first vertical blocks, and
wherein the protective member comprises:
a base bar making contact with one surface of the first horizontal block; and
at least one protrusion protruding from one surface of the base bar and inserted into at least one insertion hole formed in the first horizontal block.

4. The assembly of claim 3, wherein the insertion hole is perforated along a height direction of the first horizontal block,
an end portion of the protrusion is exposed to an outside through the insertion hole, and
the protective member is fixed to the first hook by thermally welding the exposed end portion of the protrusion.

5. The assembly of claim 1, wherein the protective member includes a plastic material softer than materials constituting the airbag housing, the first hook, and the second hook.

6. The assembly of claim 5, wherein the protective member includes one selected from the group consisting of POM (polyoxymethylene), TPU (thermo plastic polyurethane) and TPO (thermo plastic olefin).

7. An assembly of an airbag module comprising:
an airbag housing receiving an airbag cushion; and
a steering wheel provided at a central portion of the airbag module and having a mounting plate part coupled to the airbag housing such that the airbag housing is elastically movable with respect to the mounting plate part,
wherein the airbag housing having a plurality of first hooks, the mounting plate part having a plurality of second hooks coupled with the first hooks, respectively, and at least one of the first and second hooks having a protective member, at least a portion of the protective member interposed between the first and second hooks to prevent abrasion and contact noise between the first and second hooks due to the elastic movement of the airbag housing,
wherein the first hook includes a pair of first vertical blocks, which are spaced apart from each other while extending by a predetermined distance along a movement direction of the airbag housing with respect to the mounting plate part, and a first horizontal block connecting the first vertical blocks to each other, and
wherein the protective member is hooked with the first vertical blocks and the first horizontal block, and makes contact with the first and second hooks when the airbag housing elastically moves.

8. The assembly of claim 7, wherein the protective member comprises:
an upper body having a plurality of first locking parts locked with the first vertical blocks, respectively, when coupling with the first hook;
a lower body having a plurality of second locking parts locked with the first horizontal block when coupling with the first hook; and
a connection body connecting the upper body with the lower body.

9. The assembly of claim 8, wherein, in a state that the protective member is coupled with the first hook, the first locking parts extend to both sides of the upper body so that the first locking parts are locked with rear direction surfaces of the first vertical blocks in a contact state with the rear direction surfaces of the first vertical blocks, and
wherein, in the state that the protective member is coupled with the first hook, the second locking parts protrude upward from the lower body toward the first locking parts so that the second locking parts are locked with a rear direction surface of the first horizontal block in a contact state with the rear direction surface of the first horizontal block.

10. The assembly of claim 8, wherein a front direction surface of the first horizontal block is rounded, and an inner surface of the connection body, which faces the front direction surface of the first horizontal block, and an outer surface opposite to the inner surface are rounded corresponding to the front direction surface of the first horizontal block.

11. The assembly of claim 7, wherein the protective member includes a plastic material softer than materials constituting the airbag housing, the first hook, and the second hook.

12. The assembly of claim 11, wherein the protective member includes one selected from the group consisting of POM (polyoxymethylene), TPU (thermo plastic polyurethane) and TPO (thermo plastic olefin).

13. An assembly of an airbag module comprising:
an airbag housing receiving an airbag cushion; and
a steering wheel provided at a central portion of the airbag module and having a mounting plate part coupled to the airbag housing such that the airbag housing is elastically movable with respect to the mounting plate part,
wherein the airbag housing having a plurality of first hooks, the mounting plate part having a plurality of second hooks coupled with the first hooks, respectively, and at least one of the first and second hooks having a protective member, at least a portion of the protective member interposed between the first and second hooks to prevent abrasion and contact noise between the first and second hooks due to the elastic movement of the airbag housing,
wherein the first hook includes a pair of first vertical blocks, which are spaced apart from each other while extending by a predetermined distance along a movement direction of the airbag housing with respect to the mounting plate part, and a first horizontal block connecting the first vertical blocks to each other, and
wherein the protective member is hooked with the first horizontal block, and makes contact with the first and second hooks when the airbag housing elastically moves.

14. The assembly of claim 13, wherein the first horizontal block is provided at a lower central portion thereof with a cutting region, and a locking protrusion protrudes at a lower portion of the first horizontal block in the cutting region,
wherein the protective member comprises:
an upper body seated on a central top surface of the first horizontal block when coupling with the first hook; and
a lower body connected to the upper body and having a locking step so that the locking protrusion is hooked with the locking step when coupling with the first hook, and
wherein the lower body is provided in the cutting region.

15. The assembly of claim 14, wherein a front direction surface of the locking protrusion is inclined.

16. The assembly of claim 14, wherein a front direction surface of the first horizontal block is rounded, and a front direction surface of the lower body is rounded so that the front direction surface of the lower body has a curvature equal to a curvature of the front direction surface of the first horizontal block.

17. The assembly of claim 16, wherein, in a state that the protective member is coupled with the first hook, a front direction surface of the upper body and the front direction surface of the lower body are placed on a same plane with the front direction surface of the first horizontal block, or spaced apart from the front direction surface of the first horizontal block toward a rear portion of the first horizontal block.

18. The assembly of claim 13, wherein the protective member includes a plastic material softer than materials constituting the airbag housing, the first hook, and the second hook.

19. The assembly of claim 18, wherein the protective member includes one selected from the group consisting of POM (polyoxymethylene), TPU (thermo plastic polyurethane) and TPO (thermo plastic olefin).

* * * * *